United States Patent
Yabe

(10) Patent No.: US 6,349,594 B1
(45) Date of Patent: Feb. 26, 2002

(54) METHOD OF MEASURING FILM THICKNESS DISTRIBUTION

(75) Inventor: Sachiko Yabe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/522,920

(22) Filed: Mar. 10, 2000

(30) Foreign Application Priority Data

Jan. 24, 2000 (JP) ........................................ 2000-014438

(51) Int. Cl.[7] .............................................. G01B 21/08
(52) U.S. Cl. .................................................. 73/150 R
(58) Field of Search ........................... 73/150 R, 150 A; 324/688, 689, 690

(56) References Cited

U.S. PATENT DOCUMENTS

| | | | | |
|---|---|---|---|---|
| 5,367,165 A | * | 11/1994 | Toda et al. | 250/306 |
| 5,401,357 A | * | 3/1995 | Okuhira et al. | 156/643 |
| 5,438,415 A | * | 8/1995 | Kazama et al. | 356/369 |
| 5,629,054 A | * | 5/1997 | Kanai | 427/575 |

FOREIGN PATENT DOCUMENTS

| | | | |
|---|---|---|---|
| JP | 40-1203912 A | * | 8/1989 |
| JP | 4-12547 | * | 1/1992 |
| JP | 41-1037725 A | * | 2/1999 |

OTHER PUBLICATIONS

Resist Material Handbook for Semiconductor Integrated Circuit, pp. 245–246, Jul. 1996.

* cited by examiner

*Primary Examiner*—Hezron Williams
*Assistant Examiner*—Willie Morris Worth
(74) *Attorney, Agent, or Firm*—Volentine Francos, PLLC

(57) ABSTRACT

A film thickness distribution measuring method according to the present invention comprises the following steps of measuring a step form lying within a predetermined interval including a substrate exposure region having a coordinate point defined as a measurement reference on a substrate having steps to thereby extract first data L1, forming an organic film over the substrate and thereafter measuring a step form lying within the predetermined interval to thereby extract second data L2, measuring the thickness of the organic film and adding the thickness to the second data L2 to thereby extract third data L3, and determining a difference (L3–L1) between the third data L3 and the first data L1 to thereby measure a continuous film thickness distribution of the organic film formed over the substrate.

9 Claims, 4 Drawing Sheets

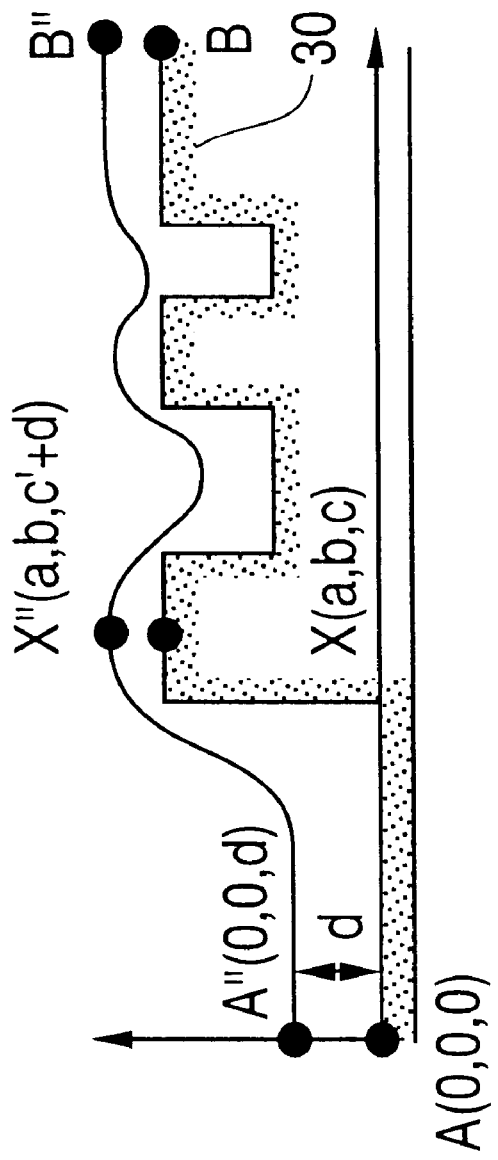

METHOD OF MEASURING FILM THICKNESS DISTRIBUTION

BACKGROUND OF THE INVENTION

1. Field of the Invention

The present invention relates to a method of measuring a film thickness distribution of an organic coating film, which is suitable for use in a photolithography process corresponding to one process in a method of manufacturing a semiconductor device, and particularly to a method of measuring a film thickness distribution of an organic coating film formed over a substrate having steps.

2. Description of the Related Art

A method described in [Resist Material Handbook For Semiconductor Integrated Circuit (1996.7.31, *REALIZE INC.*) pp. 245] has been known as a method of measuring the thickness of an organic coating film (hereinafter called "organic film") such as a resist, which is employed in a conventional photolithography process. A tracer or needle-touching method is a method of scratching part of an organic film formed over a substrate and causing an inspection needle to scan a substrate-exposed portion before and after the exposure of the substrate, thereby measuring the thickness of the organic film. An interference type film thickness measuring method is a method of vertically launching a plurality of lights different in wavelength from one another into a single-layered organic film, measuring the intensities of reflected lights for every wavelengths and calculating the thickness of the organic film by using the known refractive indexes set every organic films. The measurement of the thickness of an organic film formed over a substrate having steps is carried out by observing a cut cross-section of the substrate through the use of Scanning Electron Microscopy (SEM).

However, the above-described conventional film-thickness measuring methods involve the following problems. The needle-touching method encounters difficulties in continuously measuring the thickness of the organic film formed over the substrate having the steps. The interference type film thickness measuring method is fit for the measurement of the thickness of the single-layered organic film but unfit for the measurement of an organic film on a substrate with a bed or base film formed thereon. Further, the observation of the cut cross-section of the substrate by SEM needs to cut the substrate. Therefore, the substrate cannot be recycled and a wafer used only for the film-thickness measurement is required, thus causing demerits in terms of cost. Since the substrate is normally cut outside a clean room, the observation of the cross-section thereof by SEM needs much time and the number of man-hours.

SUMMARY OF THE INVENTION

With the foregoing problems in view, it is therefore an object of the present invention to measure a film thickness distribution of an organic film formed over a semiconductor wafer having steps, as a continuous value without destroying the semiconductor wafer.

According to one aspect of the invention, there is provided a film thickness distribution measuring method, comprising the following steps of measuring a step form lying within a predetermined interval including a substrate exposure region having a coordinate point defined as a measurement reference on a substrate having steps to thereby extract first data L1, forming an organic film over the substrate and thereafter measuring a step form lying within the predetermined interval to thereby extract second data L2, measuring the thickness of the organic film and adding the measured thickness to the second data L2 to thereby extract third data L3, and determining a difference (L3−L1) between the third data L3 and the first data L1 to thereby measure a continuous film thickness distribution of the organic film formed over the substrate.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is an explanatory view illustrating another example of the first embodiment of the present invention.

DESCRIPTION OF THE PREFERRED EMBODIMENTS

Figure 1:
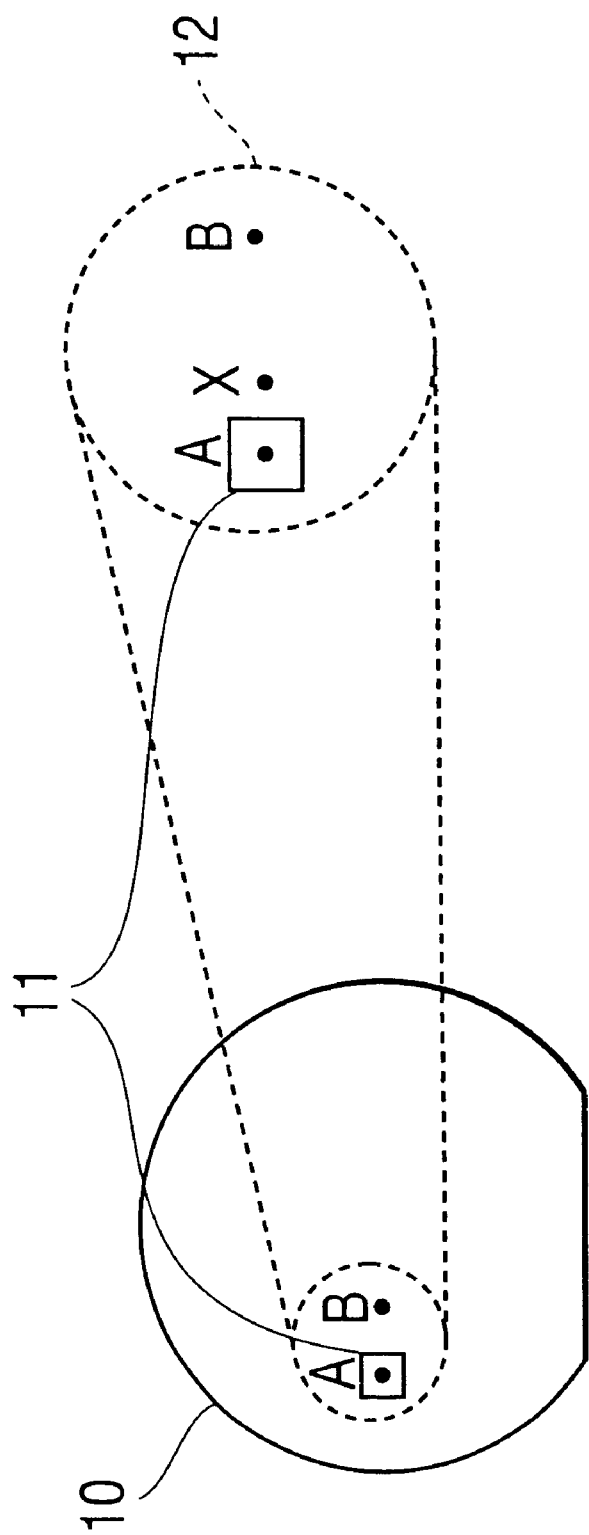
FIG. 1 is a plan view showing a semiconductor wafer according to the present invention.

Preferred embodiments of the present invention will hereinafter be described in detail with reference to the accompanying drawings. First Embodiment:

FIG. 1 is a plan view of a semiconductor wafer. The semiconductor wafer 10 has steps formed in the surface thereof and includes a silicon substrate exposure region 11 (whose one side is about 100 μm in the present embodiment). A coordinate point A (0, 0, 0) defined as the reference for step form/film-thickness measurements is included within the silicon substrate exposure region 11. Incidentally, reference numeral 12 indicates the manner in which a fragmentary portion of the semiconductor wafer 10 has been enlarged. A coordinate point B and a coordinate point X are respectively arbitrarily-set coordinate points on the surface of the semiconductor wafer 10.

A film thickness distribution measuring method according to the present embodiment will be described. FIGS. 2(*a*) through 2(*d*) are respectively explanatory views showing the first embodiment of the present invention.

(1) First Step:

A step form developed between the coordinate points A and B on the surface of the semiconductor wafer 10 is measured by atomic force microscopy (hereinafter called "AFM"). Data measured in the first step will be defined as first data L1. A first data curve corresponding to the result of measurement is shown in FIG. 2(*a*). Incidentally, a coordinate point X (a, b, c) is based on the coordinate point A (0, 0, 0).

Figure 2A:
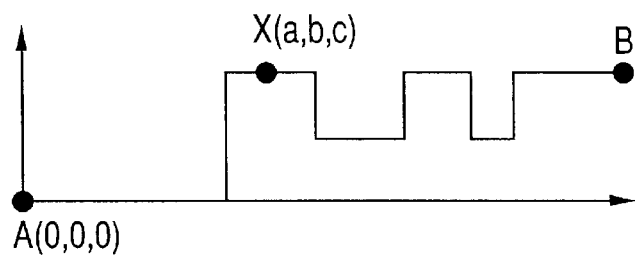
FIGS. 2(*a*)–2(*d*) are respective diagrams for explaining film thickness distribution measurements according to a first embodiment of the present invention.
Figure 2B:
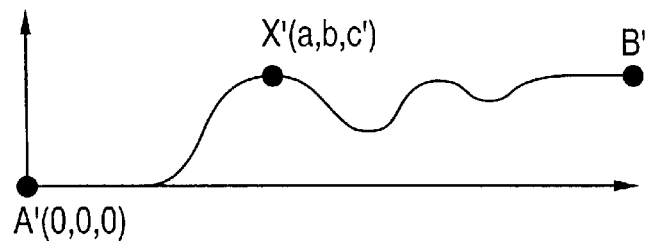

(2) Second Step:

An organic film such as a resist is formed over the surface of the semiconductor wafer 10. Thereafter, a step form between the coordinate points A and B is measured by the AFM in a manner similar to the first step. Data measured in the second step will be defined as second data L2. A second data curve corresponding to the result of measurement is illustrated in FIG. 2(b). Incidentally, coordinate points A' and B' are equivalent to those placed on or lie on the coordinate points A and B respectively. A coordinate point X' (a, b, c') lies on the coordinate point X and is based on the coordinate point A (0, 0, 0).

Figure 2C:
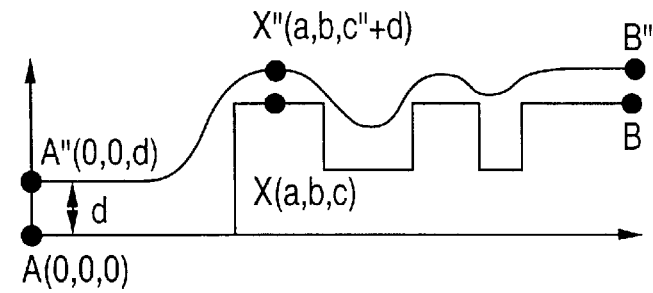

(3) Third Step:

The thickness of the organic film formed over the silicon substrate exposure region 11 is measured by a film thickness measurer or the like. The thickness of the organic film, which has been measured at this time, will be defined as d. The thickness d is equivalent to an interval between the coordinate point A and the coordinate point A'. A data curve obtained by adding the thickness d to the data curve shown in FIG. 2(a), i.e., a data curve indicative of a film thickness distribution form of the organic film formed over the semiconductor wafer 10 having the steps is shown in FIG. 2(c). Incidentally, coordinate points A"(0, 0, d) and B" lie above the coordinate points A and B respectively. A coordinate point X" (a, b, c'+d) lies above the coordinate point x and is based on the coordinate A (0, 0, 0). Data obtained in the third step will be defined as third data L3.

Further, the measurement of the thickness of the organic film is not limited to the film thickness measurer alone. When the structure of a base film formed below the organic film and its optical constant are already known, the thickness of the organic film can be measured by a spectral ellipsometer or the like. In this case, a data curve indicative of a film thickness distribution form of the organic film formed over the semiconductor wafer 10 having the steps is shown in FIG. 3. Although described repeatedly, the base film 30 formed below the organic film is already known for its structure and optical constant.

Figure 2D:
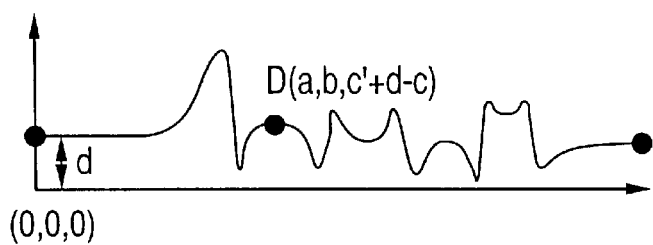

(4) Fourth Step:

FIG. 2(d) shows the manner in which a film thickness distribution of the organic film formed over the semiconductor wafer 10 having the steps has been represented by a continuous data curve. The film thickness distribution of the organic film can be obtained by determining a difference (L3−L1) between the third data L3 and the first data L1. The calculation of a coordinate point D will further be explained specifically by way of example. Here, the coordinate point D lies on the coordinate point X in a manner similar to the coordinate points X' and X". Namely, it can be easily understood that the thickness of the organic film at the coordinate point D corresponds to an interval (c'+d−c) between the coordinate point X and the coordinate point X". As a result, the coordinate point D is expressed as (a, b, c'+d−c).

If the organic film formed over the semiconductor wafer is removed by sulfuric acid and hydroperoxide mixture cleaning (SPM cleaning) or the like after all the steps have been terminated, then the semiconductor wafer can be recycled.

According to the film thickness distribution measuring method of the first embodiment as described above, the film thickness distribution of the organic film formed over the semiconductor wafer having the steps can be measured as the continuous value without destroying the semiconductor wafer.

Second Embodiment:

FIGS. 4(a) through 4(e) are respectively explanatory views showing a second embodiment of the present invention. The detailed description of the same steps as those employed in the first embodiment will be omitted.

Figure 4A:
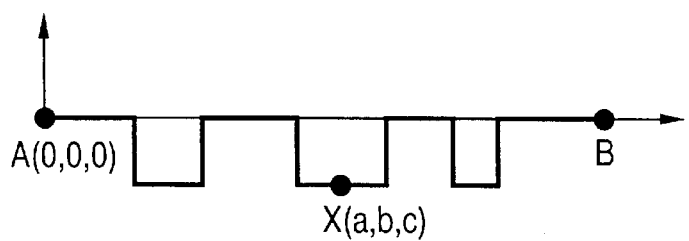
FIGS. 4(*a*)–4(*e*) are respective diagrams for explaining film thickness distribution measurements according to a second embodiment of the present invention.

(1) First Step:

Data measured in the first step will be defined as first data L1. A first data curve corresponding to the result of measurement is shown in FIG. 4(a).

Figure 4B:
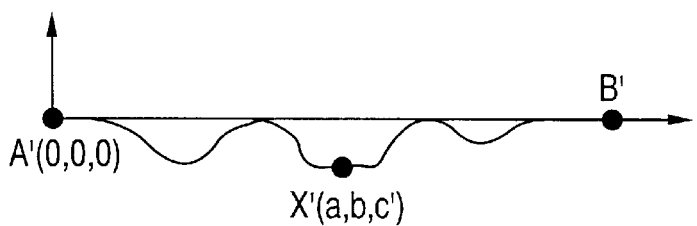

(2) Second Step:

Data measured in the second step will be defined as second data L2. A second data curve corresponding to the result of measurement is illustrated in FIG. 4(b).

Figure 4C:
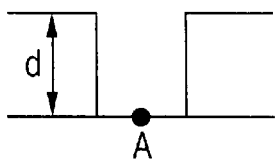
Figure 4D:
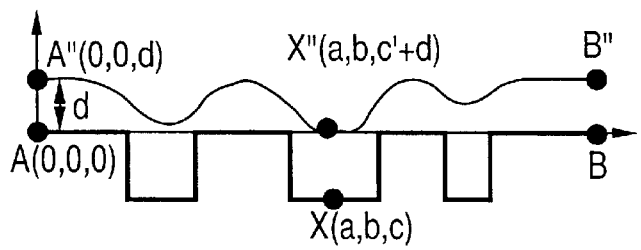

(3) Third Step:

An organic film formed over the surface of a semiconductor wafer 10 is partly removed by Secondary Ion Mass Spectrometry (SIMS) or the like to thereby expose a coordinate point A (0, 0, 0). Described specifically, the neighborhood of the coordinate point A is removed by about 10 $\mu$m in diameter. A cross-sectional view of the neighborhood of the coordinate point A from which the organic film has been removed, is shown in FIG. 4(c). The thickness d of the organic film is consecutively measured by AFM. The thickness d corresponds to an interval between the coordinate point A and a coordinate point A'. A data curve obtained by adding the thickness d to the data curve shown in FIG. 4(a), i.e., a data curve indicative of a film thickness distribution form of the organic film formed over the semiconductor wafer 10 with steps is illustrated in FIG. 4(d). Incidentally, coordinate points A" (0, 0, d) and B" are equivalent to those which lie on the coordinate points A and B respectively. A coordinate point X" (a, b, c'+d) lies on a coordinate point X and is based on the coordinate point A (0, 0, 0). Data determined in the third step will be defined as third data L3.

Figure 4E:
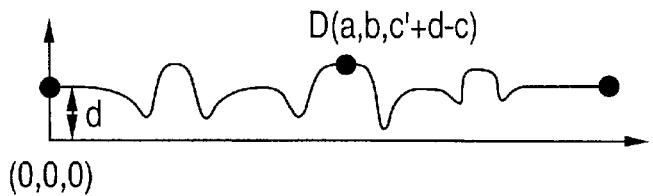

(4) Fourth Step:

FIG. 4(e) shows the manner in which a film thickness distribution of the organic film formed over the semiconductor wafer 10 having the steps has been represented by a continuous data curve. The film thickness distribution of the organic film can be determined by subtracting the first data L1 from the third data L3 (i.e., L3−L1). A coordinate point D lies on the coordinate point X in a manner similar to the coordinate points X' and X". Namely, it can be easily understood that the thickness of the organic film at the coordinate point D is equivalent to an interval (c'+d−c) between the coordinate point X and the coordinate point X". As a result, the coordinate point D is represented as (a, b, c'+d−c).

If the organic film formed over the semiconductor wafer is removed by SPM cleaning or the like after all the steps have been terminated, then the semiconductor wafer can be reused.

According to the film thickness distribution measuring method of the second embodiment as described above, the film thickness distribution of the organic film formed over the semiconductor wafer having the steps can be measured as the continuous value without destroying the semiconductor wafer.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A film thickness distribution measuring method, comprising the following steps of:

measuring a step form lying within a predetermined interval including a substrate exposure region having a coordinate point defined as a measurement reference on a substrate having steps to thereby extract first data L1;

forming an organic film over the substrate and thereafter measuring a step form lying within the predetermined interval to thereby extract second data L2;

measuring the thickness of the organic film and adding said thickness to the second data L2 to thereby extract third data L3; and determining a difference (L3−L1) between the third data L3 and the first data L1 to thereby measure a continuous film thickness distribution of the organic film formed over the substrate.

2. The film thickness distribution measuring method according to claim 1, wherein said first and second data L1 and L2 are measured by Atomic Force Microscopy (AFM).

3. The film thickness distribution measuring method according to claim 1, wherein said second data L2 is measured by a spectral ellipsometer.

4. A film thickness distribution measuring method, comprising the following steps of:

measuring a step form lying within a predetermined interval including a coordinate point defined as a measurement reference on a substrate having steps to thereby extract first data L1;

forming an organic film over the substrate and thereafter measuring a step form lying within the predetermined interval to thereby extract second data L2;

measuring the thickness of the organic film in which the surface of the substrate is exposed and adding said thickness to said second data L2 to thereby extract third data L3; and performing an arithmetic operation on (L3−L1) to thereby measure a continuous film thickness distribution of the organic film formed over the substrate.

5. The film thickness distribution measuring method according to claim 4, wherein said first and second measured data L1 and L2 are measured by AFM.

6. The film thickness distribution measuring method according to claim 4, wherein said second measured data L2 is measured by the spectral ellipsometer.

7. A film thickness distribution measuring method, comprising the following steps of:

measuring a step form lying within a predetermined interval including a substrate exposure region having a coordinate point defined as a measurement reference on a substrate having steps to thereby extract first data L1;

forming an organic film over the substrate and thereafter measuring a step form lying within the predetermined interval to thereby extract second data L2;

partly removing the organic film and exposing the coordinate point defined as the measurement reference;

thereafter measuring the thickness of the organic film and adding said thickness to the second data L2 to thereby extract third data L3; and determining a difference (L3−L1) between the third data L3 and the first data L1 to thereby measure a continuous film thickness distribution of the organic film formed over the substrate.

8. The film thickness distribution measuring method according to claim 7, wherein said partial removal of organic film is carried out by Secondary Ion Mass Spectrometry (SIMS).

9. The film thickness distribution measuring method according to claim 7, wherein said first and second measured data L1 and L2 and the thickness of said organic film are measured by Atomic Force Microscopy.

* * * * *